Figure 1:
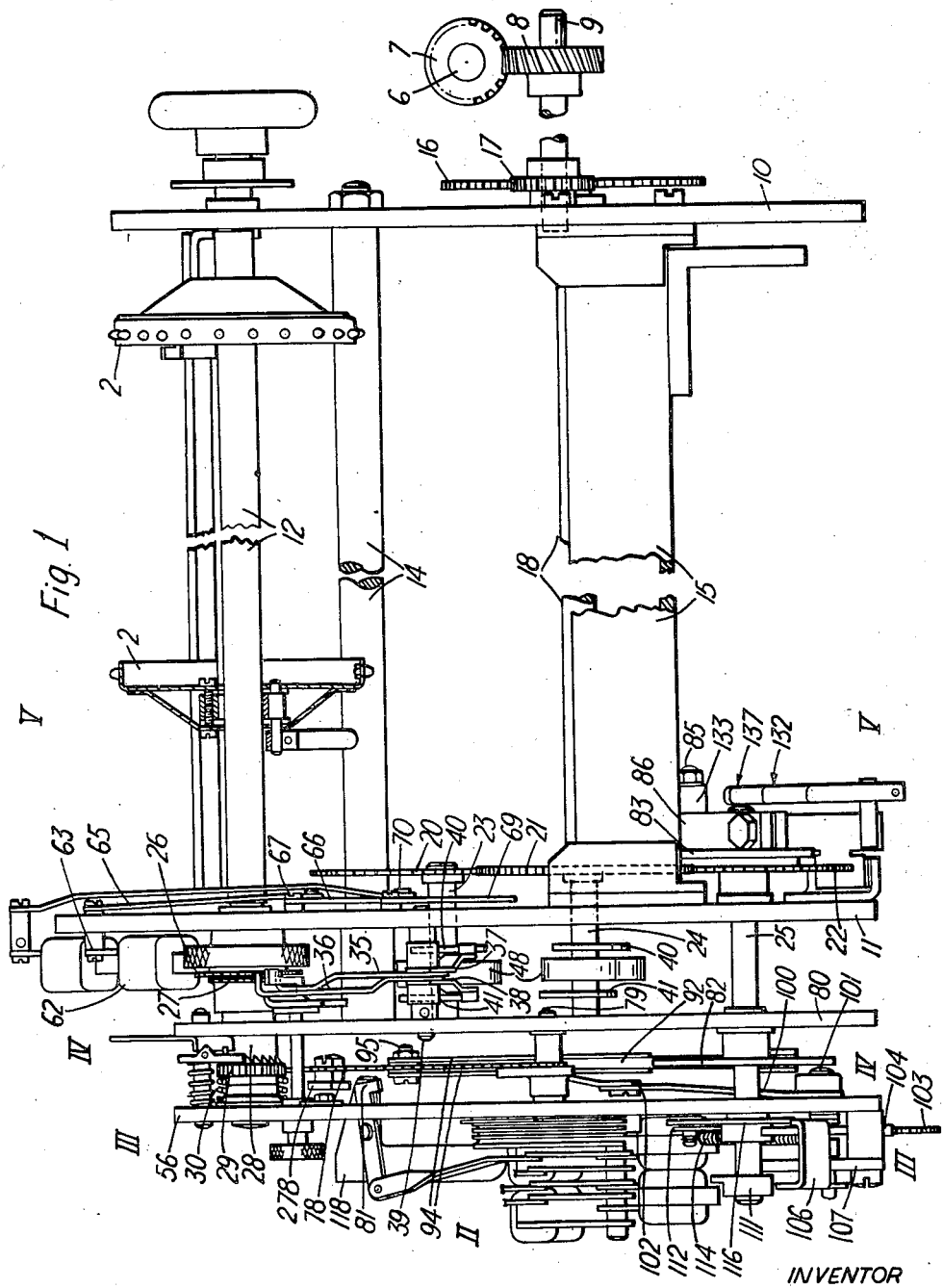

INVENTOR
RICHARD E. BALDWIN
BY
Imirie & Smiley
ATTORNEYS

July 11, 1961  R. E. BALDWIN  2,991,712
PAPER-FEEDING MECHANISMS
Filed May 21, 1959  7 Sheets-Sheet 3
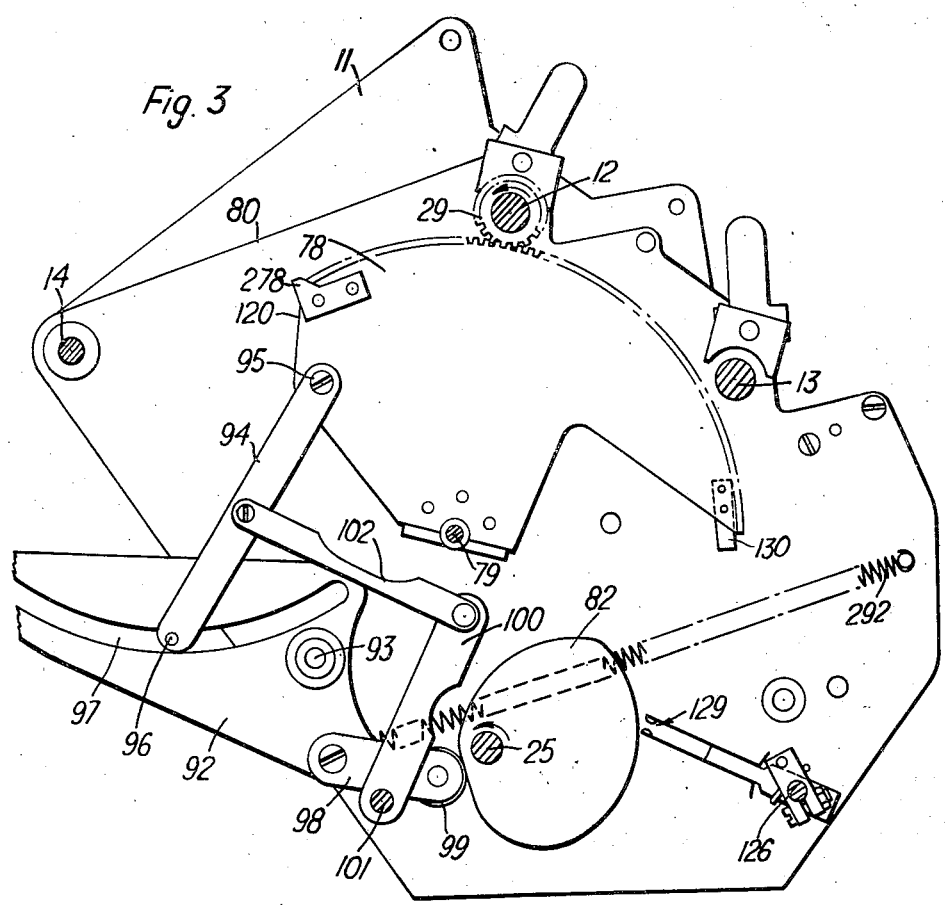
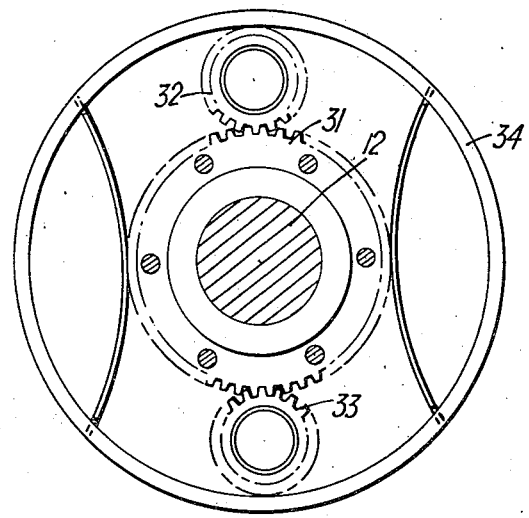
INVENTOR
RICHARD E. BALDWIN
BY
*Imirie & Smiley*
ATTORNEYS INVENTOR
RICHARD E. BALDWIN
BY
*Emirie & Smiley,*
ATTORNEYS July 11, 1961  R. E. BALDWIN  2,991,712
PAPER-FEEDING MECHANISMS
Filed May 21, 1959  7 Sheets-Sheet 5

INVENTOR
RICHARD E. BALDWIN
BY
ATTORNEYS

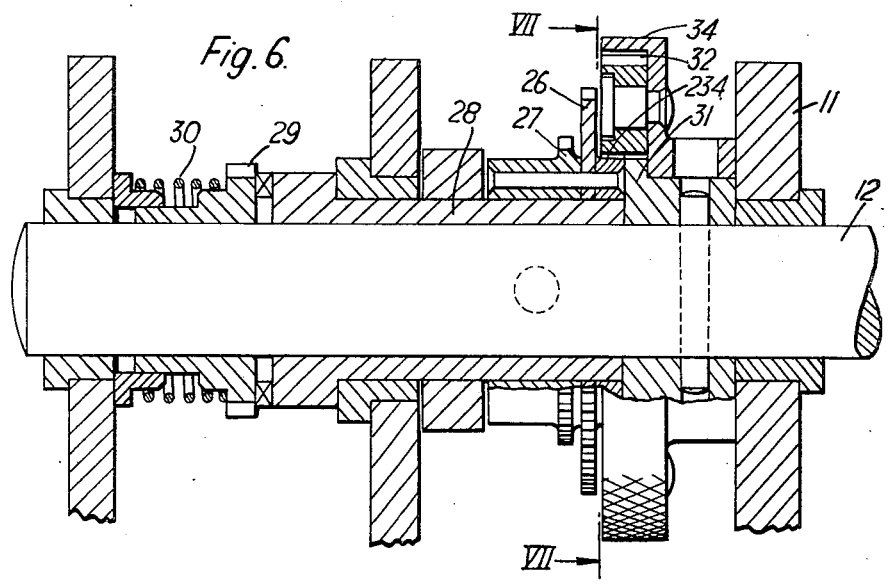
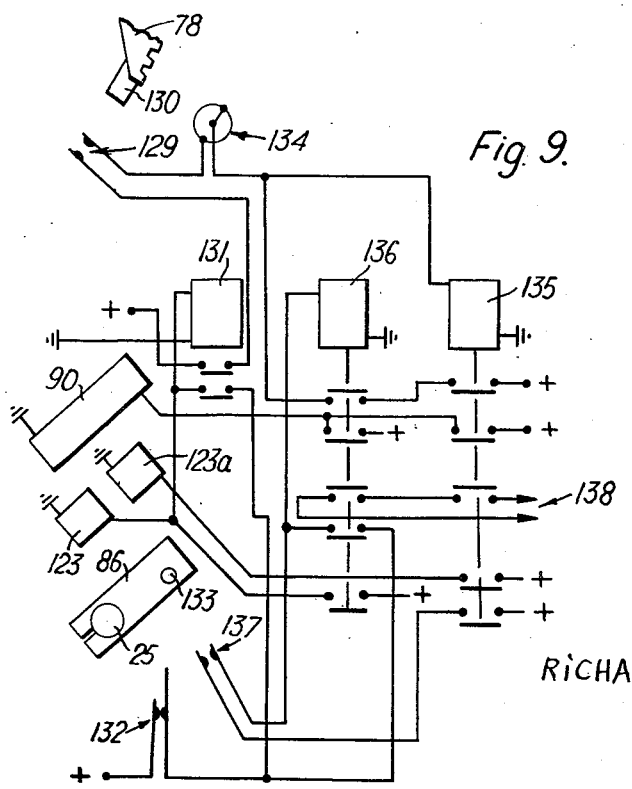

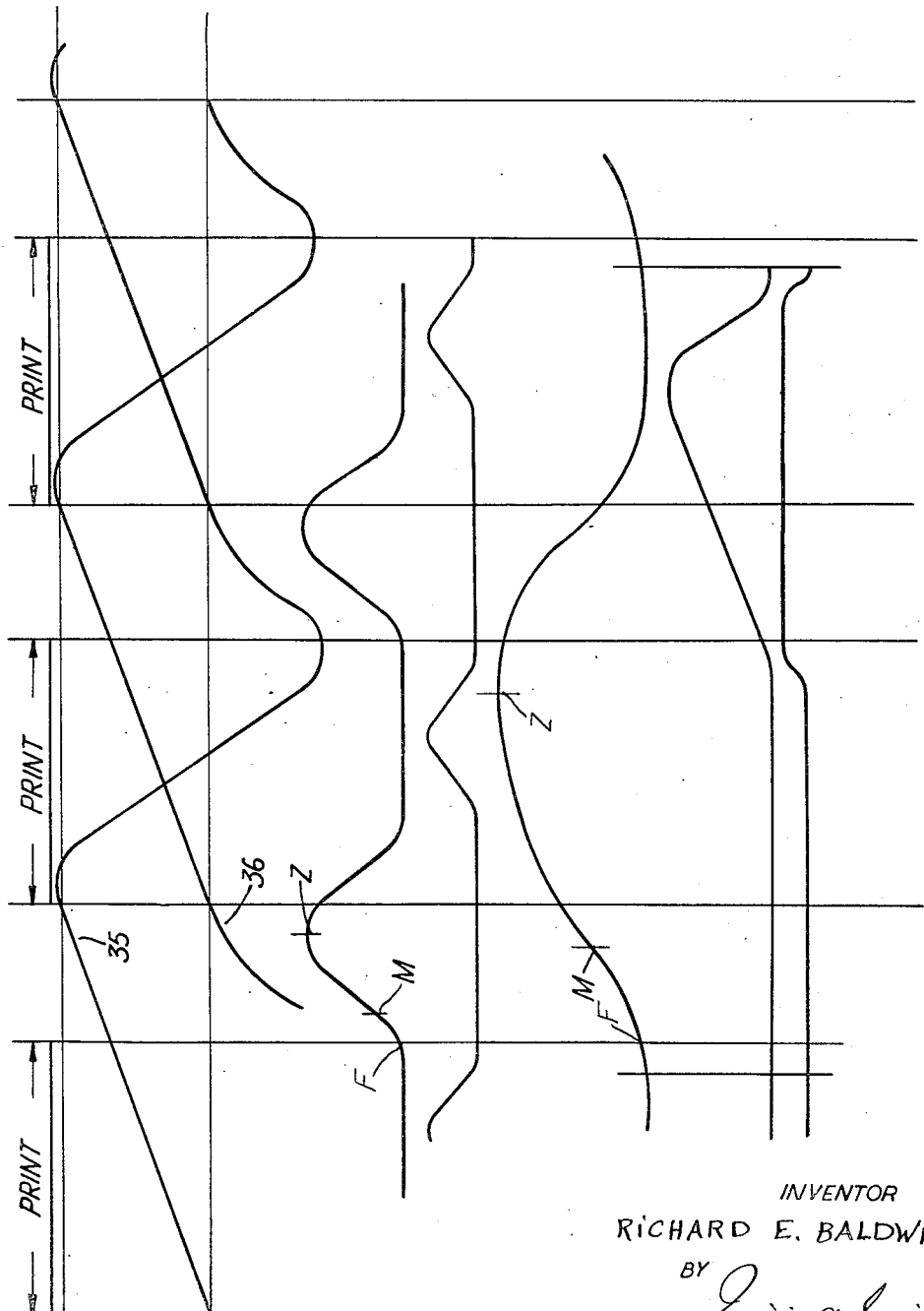

United States Patent Office 2,991,712
Patented July 11, 1961

2,991,712
PAPER-FEEDING MECHANISMS
Richard Everest Baldwin, Coulsdon, England, assignor to International Computers and Tabulators Limited, London, England, a British company
Filed May 21, 1959, Ser. No. 814,783
Claims priority, application Great Britain June 6, 1958
12 Claims. (Cl. 101—227)

This invention relates to paper-feeding mechanism and in particular to mechanism for effecting what are known in the art as long paper-feeding operations.

Many forms of long paper-feeding mechanisms are known and are in use in machines, such for example as tabulators or printing machines, controlled by statistical records such as cards or tapes. In general, the known forms of mechanism are of two kinds, that is mechanical or electro-mechanical but the known mechanisms are both subject to operational conditions which, in order to preserve accuracy when effecting long-paper feeding, prevent any substantial increase in the rate of operation thereof beyond the rates at which they are currently capable of satisfactory operation. With the known forms of mechanical long paper-feeding mechanisms the construction is such that there is a tendency to "snatch" at the commencement of the operation and for impact of feeding elements against fixed stops or the like at the end of the paper feeding operation resulting in rebounding and the need for adjustment to the desired position of ultimate feed. In the electro-mechanical devices the paper-feeding operations are often effected by electric motors and while these devices may avoid impact and rebounding the rate of operation is retarded by the need for the motor to be started from the stationary condition thereof or, if the drive is through a clutch there is an inevitable "snatch" as the paper is immediately fed at the long paper-feeding speed. So far as is known, in all forms of long paper-feeding mechanism previously proposed it has been the practice to move the paper during a long paper-feeding operation at a substantially constant speed from initiation to termination of the long paper-feeding operation.

It is a main object of the present invention to provide long paper-feeding mechanism capable of operation with considerable accuracy and of effecting linear movement of paper during a long feed at a rate in excess of that which is possible with long paper-feeding mechanism currently in use. In principle this object is achieved by so constructing a long paper-feeding mechanism that during a long-feeding operation the paper is moved with a substantially constant acceleration to a position intermediate the positions of starting and termination and is then decelerated at a substantially uniform rate to the position of termination.

According to the invention long paper-feeding mechanism comprises paper-engaging elements rotatable with a paper-feeding shaft to effect linear movement of a paper web, at least one toothed wheel connected to the shaft for rotation therewith, and cam-operated means co-operating with said toothed wheel to effect rotation thereof in a manner such that paper is advanced from one position of printing thereon with a linear speed which accelerates substantially uniformly to a maximum and then decelerates substantially uniformly to locate the paper in position for the next printing operation.

Figure 2:
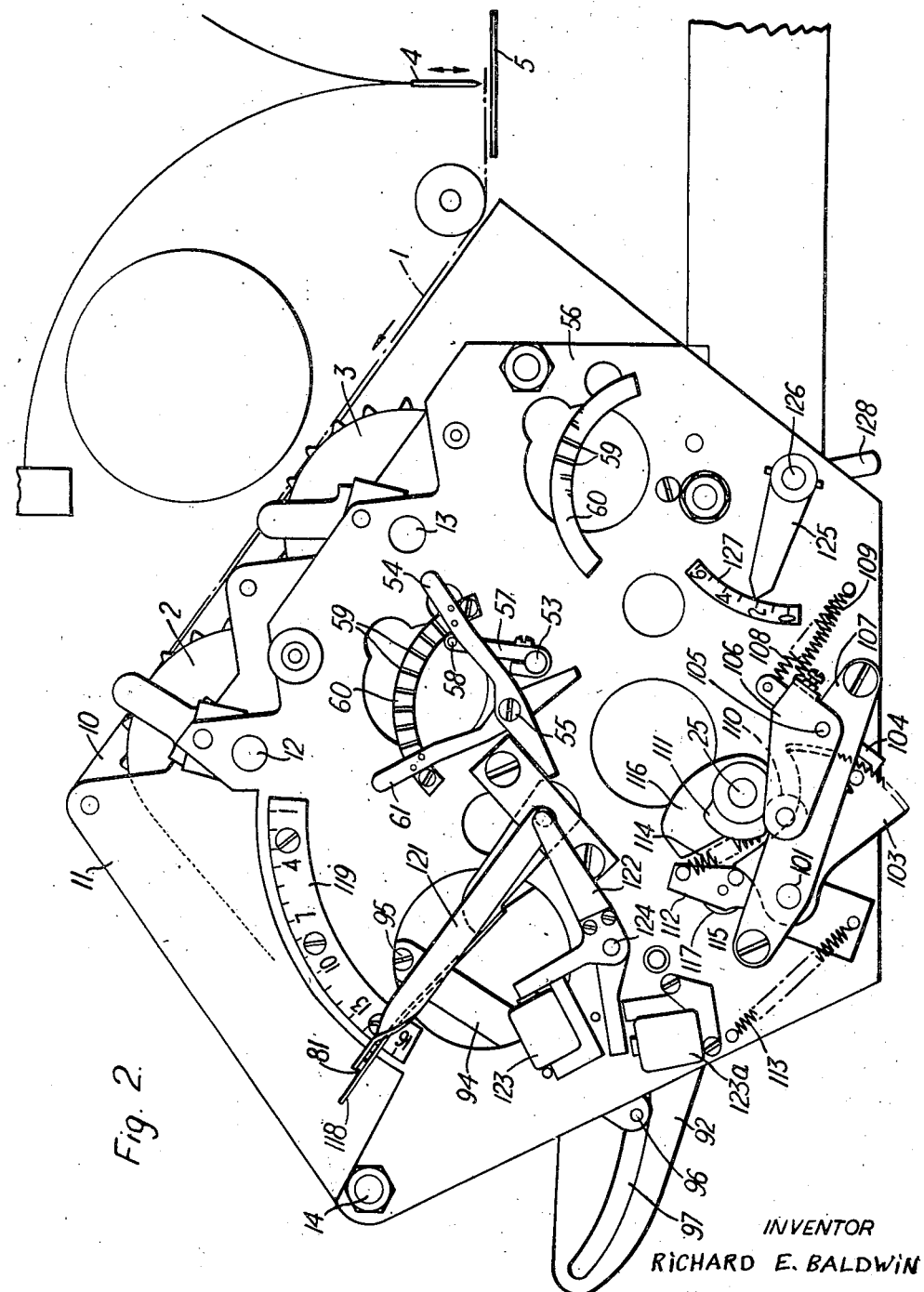
Figure 4:
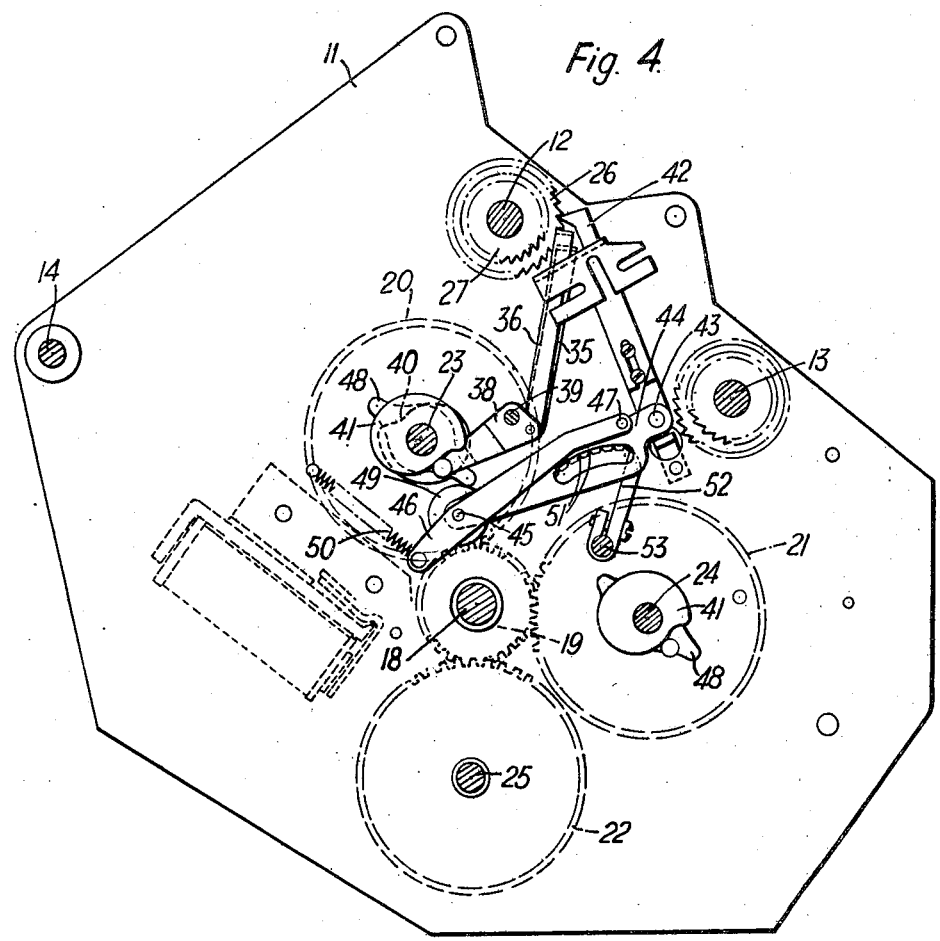
Figure 10:
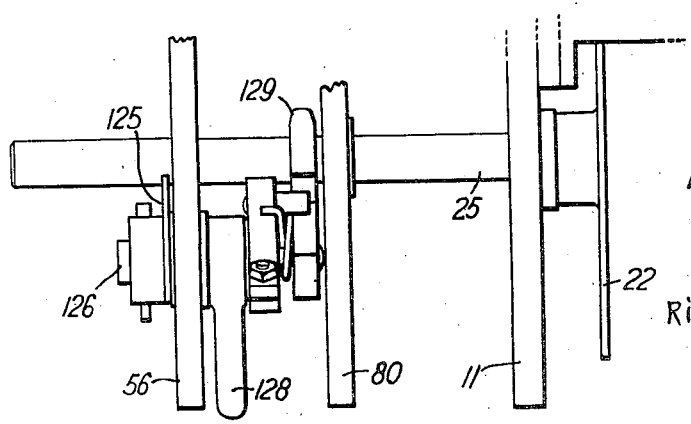
Figure 5:
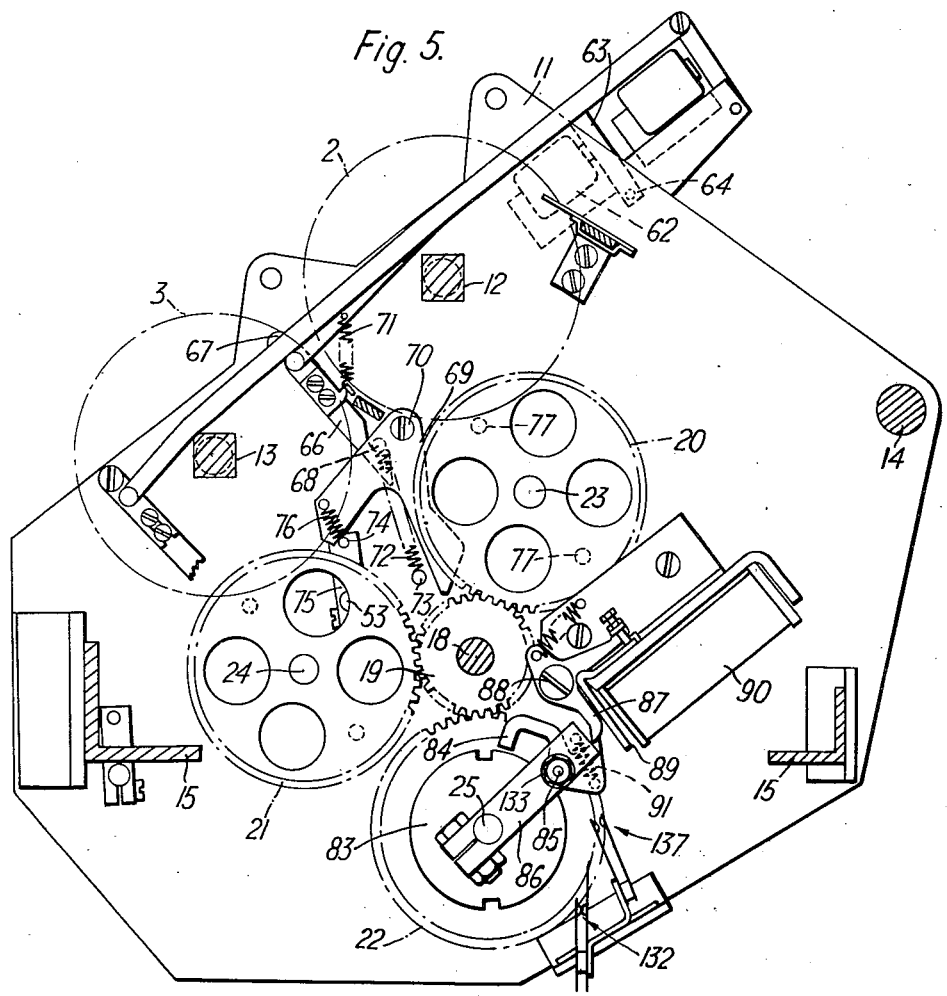

In order that the invention may be clearly understood one embodiment thereof will now be described, by way of example, with reference to the accompanying diagrammatic drawings, in which:

FIG. 1 is an elevation of paper-feeding mechanism according to the invention, some parts being omitted for clarity, FIG. 2 is a view looking in the direction of arrow II, FIG. 1, FIG. 3 is a section on line III—III, FIG. 1, FIG. 4 is a section on line IV—IV, FIG. 1, FIG. 5 is a section on line V—V, FIG. 1, FIG. 6 illustrates a part of FIG. 1 to an enlarged scale, FIG. 7 is a section on line VII—VII, FIG. 6, FIG. 8 is a timing diagram, FIG. 9 is a circuit diagram of electrical components used in conjunction with the mechanism, and FIG. 10 is a detail showing some of the parts omitted from FIG. 1.

Referring to the drawings, two webs 1 of paper are disposed in side-by-side relation for respective lengthwise movement by pairs of pin-wheels 2, 3, FIG. 2. The pairs of pin-wheels are rotated independently one of the other by apparatus which, in general, is duplicated although some parts are common to both pairs of pin-wheels. For simplicity only the feeding apparatus for the pin-wheels 2 is fully illustrated in the drawings and described herein, mention being made where necessary to any part which is common to the driving of both pairs of pin-wheels.

The means for effecting printing on the webs forms no part of the invention but for the purposes of illustration and description it is assumed that printing is effected by wire-like styluses 4, FIG. 2, in the manner described in British patent specification No. 707,736. The paper webs are drawn over a flat platen 5 and the marking ends of the styluses are reciprocated continuously in a direction at right-angles to the lengths of the webs by means not shown but operated from a continuously rotating shaft 6, FIG. 1. Printing is effected by lengthwise movement of the styluses towards the platen and the width of the characters is determined by the amplitude of the above-mentioned reciprocation of the styluses while the height of the characters is determined by the linear speed of the paper webs during a printing operation.

The paper-feeding apparatus is driven from shaft 6 by a pair of skew gears 7, 8 secured respectively to shaft 6 and to a stub shaft 9 rotatable in the frame plate 10 of a pair of frame plates 10, 11 by which the paper-feeding shafts 12, 13 for the pinwheels are supported for rotation. Plates 10, 11 are spaced apart by a tie-rod 14 and anglebrackets 15, FIG. 1.

The pin-wheels are, in known manner, supported by portions of the shafts 12 and 13 which are of square cross-section and the pin-wheels are adjustable lengthwise of the shafts to accommodate webs of different widths. The pins of the pin-wheels, as is customary, engage in marginal perforations, not shown, in the webs in order to effect lengthwise movement thereof.

A gear 16, FIG. 1, secured to stub shaft 9, meshes with a pinion 17 secured to a drive shaft 18, and also secured to shaft 18 is a gear 19, FIG. 5, which drives gears 20, 21 and 22 in the ratio of 1:2, the gears 20, 21 being respectively secured to rotatable spindles 23, 24, and the gear 22 being freely rotatable on a cam shaft 25.

During printing operations the pin wheels 2 are rotated by one or other of a pair of ratchet wheels 26, 27, FIGS. 1, 4 and 6, pinned to each other and to a sleeve 28, FIG. 6, provided at one end with face ratchet teeth which engage with face ratchet teeth formed on a long feed pinion 29 rotatable about shaft 12. The face teeth on gear 29 are retained by a spring 30 in engagement with the face teeth on sleeve 28.

A gear 31 is pinned to shaft 12 and meshes with pinions 32, 33, FIG. 7, carried by a wheel 34 rotatable about the hub of gear 31. The ratchet wheels 26, 27 also have pinned thereto a gear wheel 234 which has two teeth more than the gear 31 and manual rotation of wheel 34 before printing commences permits a fine adjustment to be made in respect of the distance travelled by the web 1 during the printing of characters by the styluses 4.

The ratchet wheels 26, 27 are of different diameters and are provided with different numbers of teeth but the teeth of both ratchet wheels have the same linear pitch so that by causing a pair of pawls 35, 36, FIGS. 1 and 4, to co-operate with one or other of the ratchet wheels it is possible, in a simple manner, to obtain a faster or slower linear speed of the web 2 during printing operations. It will be understood that if it is desired to accommodate a number of linear speeds in excess of two this can be done by increasing appropriately the number of ratchet wheels.

The pawls 35, 36 are carried by arms 37, 38, FIG. 1, pivoted at 39, FIG. 4, and are operated by cams 40, 41 secured to spindle 23 which makes one-half revolution for each printing cycle. Thus during one revolution of spindle 23 the cams 40, 41 operate in succession to effect rocking of pawls 35, 36, the timing of the cams being such, as indicated in FIG. 8, that one pawl takes over from the other at the beginning of each printing cycle and each pawl moves rapidly before taking up the feed and reduces its speed to the desired rate of feed at the commencement of its active period.

Additional line spacing is effected between printing times by a line-spacing pawl 42, FIG. 4, this pawl and its associated mechanism being omitted from FIG. 1 for clarity. Pawl 42 co-operates with the same ratchet wheel 26 or 27 as is engaged by pawls 35, 36 and is pivoted at 43 to a control lever 44 which is pivoted at 45 to a locating lever 46, the lever 46 being pivoted at 47 to frame plates 11 and 80. Operation of the control lever 44 is effected by a cam 48 on spindle 23, and on spindle 24 for paper-feeding shaft 13, the cam co-operating with a follower 49 which is urged towards the cam by a spring 50.

The control lever is a built-up element consisting of two plates between which is sandwiched a length-of-feed determining plate having an arcuate edge provided with length-of-feed determining notches 51. A control lever pivot arm 52 secured to a rocking pin 53 the axis of which is co-incident with the centre of curvature of the plate edge provided with the notches 51, when lever 44 is in the datum position thereof, as illustrated in FIG. 4.

The positions of the notches 51 are so selected as to provide multiples of one tooth pitch of the ratchet wheels 26, 27 and the extent of line spacing is determined by co-operation of the end of pivot arm 52 with the upper edge of one of the notches 51. Before printing commences the extent of line spacing is fixed by manual operation of a first setting lever 54, FIG. 2, which is pivoted at 55 to frame plates 11 and 80. A setting arm 57 is secured to pin 53 and carries a lateral abutment 58 which engages the lever 54 as shown in FIG. 2. The lever 54 carries a tooth, not shown, which is engageable in a slot 59 of a setting plate 60 secured to plate 56 and movement of the tooth from one slot 59 to another is effected by springing lever 54 away from plate 60 and rotating lever 54 to the desired location thereof. The spacing of the slots 59 corresponds with that of the notches 51.

Operation of cam 48 to effect a line feeding operation causes the control lever 44 to be rocked counter-clockwise, as viewed in FIG. 4, about the pivot arm 52 thus causing pawl 42 to effect rotation of the ratchet wheel 26 or 27 with which it is set to co-operate.

As will be well understood, it is sometimes necessary between successive lines of printing to effect feeding by a distance greater than that of the line spacing and when such greater distance is relatively short, for example about one inch, the feeding movement is effected by cam 48 and arm 52 by arranging that the setting arm 57 be temporarily rocked away from the setting lever 54. The extent of the short long feed is predetermined by a second setting lever 61, FIG. 2, which is also pivoted at 55 and co-operates with the setting plate 60 in a manner similar to that described above with reference to the setting lever 54.

A short long feed is initiated by an electric signal from any suitable source, not shown, and is applied to an electromagnet 62, FIG. 5, having an armature 63 pivoted at 64 and connected to a link 65 the opposite end of which is pivoted to a latch 66 which, in turn, is pivoted at 67 to the frame plate 11. Latch 66 co-operates with a latch pin 68 extending laterally from a pivot arm actuator 69 pivoted at 70 to frame plate 11. Latch 66 is urged into co-operation with pin 68 by a light spring 71 and the latch pin 68 forms an anchor for one end of a strong spring 72 the opposite end of which is anchored at 73 to frame plate 11.

One arm of the pivot arm actuator 69 is arranged to co-operate with a pin 74 extending from an extended feed-determining arm 75 secured to the pin 53 and is retained in co-operation with pin 74 by a light spring 76. Once per printing cycle one of two restoring members shown as pins 77 extending laterally from the gear 20 rocks the actuator 69 so that pin 68 is just disengaged from latch 66. If before this time the electromagnet 62 is energised the pull exerted thereby is sufficient to dislodge latch 66 from latch pin 68 until this disengagement occurs. Further movement of the pin 77 then allows a counter-clockwise, as viewed in FIG. 5, rocking of actuator 69 which descends on to the pin 74 on arm 75 thereby pushing it and rocking pin 53 as far as it is permitted to travel by the position of the setting lever 61. The parts just described remain in this position during the "short" long feeding operation and when this is completed the other of the pins 77 restores the actuator 69, clockwise as viewed in FIG. 5, and causes it to be latched by co-operation of its pins 68 with the latch 66.

Long paper feeding operations other than that described above are effected by a toothed paper-feeding sector 78, FIGS. 1 and 3, which meshes with the pinion 29 and is rockable about the pivot 79 journalled in the outer frame plate 56 and a further plate 80.

The toothed paper-feeding sector 78 is movable towards and away from a length-of-feed determining stop 81, FIGS. 1 and 2, which is interposable into the path of an abutment 278, FIGS. 1 and 3, carried by the sector 78, and rocking of the sector to effect a long paper-feeding operation is controlled by a cam 82, FIG. 3, rotatable by the cam shaft 25, and self-adjusting linkage, to be described below, which connects cam 82 with the sector 78 to determine the extent of rocking movement of the sector under control of cam 82.

The cam shaft 25 is normally stationary and is rotatable under control of a selectively operable one-revolution clutch, FIG. 5, which consists of a dog portion 83 secured to gear 22 which is freely rotatable about the cam shaft 25, a clutch pawl 84 pivoted at 85 to a clutch arm 86 secured to cam shaft 25, a trip pawl 87 rockable about a pivot 88 by the armature of an electromagnet 90, and a spring 91 which urges pawl 84 towards the dog portion 83.

The self-adjusting linkage comprises a driving lever 92, FIG. 3, rockable about a pivot 93, and driving links 94 which are pivoted at 95 to the sector 78 and at their opposite ends are guided by a connecting pin 96 on which rides a roller, not shown, for movement lengthwise of an arcuate slot 97 provided in the driving lever 92. Driving lever 92 has an arm 98 secured thereto and the arm 98 carries a cam follower 99 which co-operates with cam 82.

During a long paper-feeding operation under control of cam 82 the driving lever 92 is rocked clockwise from the position thereof shown in FIG. 3 and when the lever is in the position thereof at which, through links 94, it has rocked sector 78 to the extreme clockwise position thereof, the centre of curvature of slot 97 is co-incident with the axis of the pivot 95 for the links 94.

The self-adjusting linkage also includes a rocking arm 100, FIG. 3, secured to a rocking spindle 101, the arm 100 being pivotally connected, through a connecting link 102 with the links 94. The rocking arm 100 co-operates with restraining means which operate to constrain arm 100 against rocking movement during operation of the driving lever 92 to impart rotation to the paper-feeding shaft 12 through sector 78 and pinion 29.

The restraining means includes a toothed restraining sector 103, FIG. 2, which is rockable with the rocking spindle 101 and a restraining pawl 104 pivoted at 105 with a bracket 106 to a plate 107 secured to frame plate 56. A spring 108 urges pawl 104 towards sector 103 and a spring 109 urges a cam follower 110 carried by bracket 106 into co-operation with a pawl-tripping cam 111 rotatable with the cam shaft 25. A swinging arm 112 is freely mounted on rocking shaft 101 and is urged towards the restraining sector 103 by a sector-control spring 113 and a relief spring 114. A sector-engaging abutment 115 carried by the swinging arm 112 is urged by the sector-control spring 113 into engagement with the restraining sector 103 to effect rocking of the sector 103 clockwise as viewed in FIG. 2. The pressure exerted by spring 113 on sector 103 through swinging arm 112 and abutment 115 is sufficient to ensure that during rotation of the paper-feeding shaft 12 by ratchet 26 or 27 and pawls 35, 36, or by pawl 42, the sector 78 is caused to rotate clockwise tooth-by-tooth during rotation of pinion 29 with shaft 12 and to guard against slipping of the face teeth provided on pinion 29 as described above.

Also rotatable with the cam shaft 25 is a paper-feeding sector restoring cam 116 arranged to cooperate with a follower roller 117 carried by the swinging arm 112, the cam 116 being arranged during a paper-feeding operation under control of cam 82 to disengage the abutment 115 from sector 103 against the action of springs 113, 114.

Operation of the apparatus described above is as follows:

During printing operations when successive lines of printing are spaced apart by a regular predetermined extent of line-spacing, as when printing a name and address and a succession of "items" on a form, the paper web 1 is advanced from one line printing position to the next by the pawls 35, 36 for single-line spacing, and by pawl 42 where a greater spacing is required, the extent of feed being determined by the control lever 44 and pivot arm 52 as described above. A short long feed, such as occurs between the last line of a name and address and the first line at which an item is to be printed, is effected under control of cam 48 and electromagnet 62, which, as described above, varies the position of the control lever pivot arm 52 so as to cause the pawl 42 to effect the desired length of paper feed.

A long feed from one form to the first line at which printing is to be effected on the next succeeding form is effected by the paper-feeding sector 78 under control of cam 82. Before printing commences the support 118, FIG. 2, is manually adjusted relative to scale 119 to determine the position from which the sector 78 moves in a clockwise direction, as viewed in FIG. 2. Normally the position at which the stop 81 carried by support 118 is interposed into the path of sector 78 is such that the sector abuts the stop when the first line of a form is being printed.

During feeding of the paper by pawls 35, 36 and 42 the sector 78, under control of spring 113, FIG. 2, and pinion 29, FIG. 3, is moved clockwise, as viewed in FIG. 3, away from the stop 81 and during this movement of the sector the pin 96 travels along slot 97 towards pivot 93 thus adjusting the effective length of the linkage 92, 94 to reduce the length of feed which will be effected by sector 78, on movement thereof by cam 82, by an amount equal to that by which the paper is fed by pawls 35, 36, 42. Thus when electromagnet 90, FIG. 5, is energized to initiate a long paper feed to the first line of the next form the sector 78 feeds the paper only by the required residue distance away from stop 81 by which the sector has not been moved under control of spring 113 and pinion 29.

Movement of sector 78 under control of spring 113 and pinion 29 causes, through connecting link 102 and rocking arm 100, rocking of the restraining sector 103, clockwise as viewed in FIG. 2. When the cam shaft 25 is rotated following energisation of electromagnet 90 the cams 82, 116, and 111 are rotated clockwise as viewed in FIGS. 2 and 3, the cam 82 rocking driving lever 92 to effect, through links 94, clockwise rotation of the sector 78. During this movement the compressive force in links 94 tends to drive the roller on pin 96 to the outer end of the curved slot 97. The tension thus produced in link 102 causes the sector 103 to be urged counter-clockwise, as viewed in FIG. 2, but it is restrained against such movement by pawl 104. The driving lever 92 is restored by a driving lever spring 292, FIG. 3, and, simultaneously with this restoring movement, the cam 116 drives the swinging arm 112 counter-clockwise, as viewed in FIG. 2, pulling sector 103 by means of spring 114. The lever 92 moves to its full extent and, assisted by the compression produced in the link 102 by the spring 114, pulls the sector 78 counter-clockwise against stop 81. During this period the cam 111 is holding the bracket 106 in the position thereof in which the pawl 104 is disengaged from the sector 103. It will be understood that counter-clockwise rotation of sector 78 will effect rotation of pinion 29 in the reverse direction to that in which shaft 12 rotates to effect paper-feeding but shaft 12 is not rotated at this time because the face ratchet teeth on pinion 29 then ride over the face ratchet teeth on sleeve 28, FIG. 6.

The cams 48 and 82 are shaped as shown in FIGS. 4 and 3 respectively and are so timed that, as illustrated in FIG. 8, a feeding stroke of the pin wheel actuating means 42 or 78 commences at point F and ends at point Z. During the first part of the stroke the pin wheels 2 are rotated with a substantially uniform velocity to point M, at which they reach their maximum velocity, and thereafter the feeding velocity is retarded so that the pin wheels are rotated to the end of the feeding stroke, that is to point Z, with a substantially uniform deceleration. At point Z the feeding velocity is zero and the return stroke of the actuating means 42 or 78 commences. By this means it is possible to ensure that the end of the feed is exactly at the desired new line printing position thus avoiding "snatching" at the start of the long feed and the need to accommodate overrunning or impact due to the sudden arresting of feeding elements by fixed stops or the like. The apparatus accordingly is capable of effecting all long paper-feeding operations at a high linear speed and with considerable accuracy.

The length-of-feed determining stop 81 which, as described above, is interposable into the path of the sector 78 is pivoted on the support 118, FIGS. 1 and 2, the support being adapted for manual adjustment relative to the scale 119, FIG. 2, to predetermine the position at which the end 120, FIG. 3 of sector 78 will engage the stop 81 when the stop is interposed in the path thereof. The stop is rockable into and out of the path of the sector 78 by a link 121, FIG. 2, connected to the armature 122 of an electromagnet 123, the armature being pivoted at 124. If the sector 78 is always to feed the web to a single predetermined position, such, for example, as to the first line printing position of each form, only one stop 81 need be provided but if it is desired that the sector 78 be capable, at different times, of effecting long feeds to two or more positions then two or more stops 81 are provided each operable by an electromagnet 123 appropriate thereto, the electromagnets being selectively operable to determine the order in which the stops 81 are interposed into the path of the sector thereby to determine the order in which the long feeds are effected.

One example of the use of more than one stop 81 is the condition which sometimes arises from the fact that the number of items to be printed exceeds the capacity of a form. In such instances the long paper feed which follows the printing of the last item on one form is not a long feed to the first line position on the next succeeding form but is to the first item line position on the succeeding form. To accommodate this requirement, a pointer 125, FIGS. 2 and 10, is secured to a spindle 126 and co-operates with a scale 127. Before printing commences the pointer 125 is set to a position indicative of the last item printing line on a form and the spindle 126 and pointer 125 are clamped in this position by a clamp 128. Also secured to spindle 126 is a pair of normally open electrical contacts 129, FIGS. 3, 9 and 10, adapted to be closed by a tip 130 made of insulating material and carried by the sector 78.

It will be understood that during item printing operations the sector 78 will be rotated clockwise, as viewed in FIG. 3, by spring 113 and pinion 29 to a position at which the tip 130 closes contacts 129 and when this occurs the electromagnet 90 is energised to effect rotation of the cam shaft 25. The electrical circuit is conditioned to permit energisation of electromagnet 90 at this time by a relay 131, FIG. 9, which was closed by the energisation of electromagnet 123 preparatory to the next long feed to be initiated. The relay 131 is self-holding through break contacts 132 which are operated by a stud 133, FIG. 5, carried by the clutch arm 86. At the appropriate instant in the printing cycle after the contacts 129 are closed, a cyclically operable switch 134, FIG. 9, preferably operated from shaft 18, closes a second relay 135 and this in turn completes the electric circuit to the electromagnet 90 and to an electromagnet 123a, FIG. 2, which controls the operation of a second length-of-feed determining stop, not shown, similar to the stop 81. Closing of switch 134 also conditions the circuit to a further relay 136.

The energisation of electromagnet 90 causes the shaft 25 to make one revolution during which the sector 78 effects feeding of the paper to the first line printing position of the next form but as the next printing operation is to be in respect of an "overflow" item it is not to be printed at this position. Accordingly, the stud 133 first operates to open the contacts 132, FIGS. 5 and 9, and then to close contacts 137. Opening of contacts 132 breaks the circuit to relay 131, FIG. 9, and closing of contacts 137 completes the circuit to relay 136 which opens the holding circuit for relay 135. The circuit to relay 136 now being closed causes relay 136 to again energise electromagnet 90 so that shaft 25 makes a further one revolution during which the sector 78 is moved away from the stop 81 controlled by electromagnet 123a and feeds the paper to the first item line printing position of the succeeding form. Relay 136 also holds open the circuit 138, FIG. 9, which controls printing operations so that no printing is effected until after the second of the two paper-feeding operations of sector 78, and closes its own holding circuit through the contacts 132. The stud 133 operates during the second rotation of shaft 25 to open the circuit to relay 136 and so return the circuit to the condition thereof which is inactive until again initiated by contacts 129 being closed by tip 130.

The long paper-feeding mechanism according to the invention has been described above with reference to the use thereof in conjunction with printing apparatus which relies on movement of the paper at a constant linear speed during character definition. While the mechanism is of particular value when used in conjunction with this form of printing apparatus it is to be understood that the long paper-feeding mechanism can also with advantage be used in conjunction with other forms of printing apparatus, for example it may be used in conjunction with printing apparatus in which printing is effected by type mounted on type bars or sectors.

I claim:

1. Long paper-feeding mechanism for printing apparatus, comprising a paper-feeding shaft supported for rotation about the longitudinal axis thereof, paper-engaging elements rotatable with said shaft to effect linear movement of a paper web, a ratchet wheel rotatable with said shaft, a pawl co-operable with said wheel to effect rotation thereof, a control lever connected to the pawl to effect operation thereof, a pivot arm movable relative to the control lever to determine the extent of the feeding stroke of the pawl and about which the control lever is pivoted, a continuously rotatable cam operable to effect rocking of the control lever about the pivot arm following each printing operation, a length-of-feed plate carried by said control lever, said plate being provided with a plurality of length-of-feed determining notches, a rocking pin with which the pivot arm is rockable to effect location of the pin in one or other of said notches, a setting arm rockable with the rocking pin, an abutment carried by the setting arm for movement therewith a manually operable setting lever rockable about a pivot pin therefor and arranged for co-operation with said abutment, and a fixed setting plate co-operable with the setting lever in a predetermined position thereof thereby to determine with which of said notches the pivot arm is engaged.

2. Long paper-feeding mechanism according to claim 1, including a second setting lever manually rotatable about said pivot pin to co-operate with the setting plate and predetermine a second position of co-operation of the pivot arm with the length-of-feed determining plate, and selectively operable means to effect movement of the pivot arm from the position thereof as determined by said first-mentioned setting lever to that as determined by the second setting lever.

3. Long paper-feeding mechanism according to claim 2, wherein said selectively operable means comprises a feed-determining arm secured to said rocking pin, a pivoted actuator spring-urged into engagement with the feed-determining arm, latch means normally restraining the pivoted actuator from effecting rocking of the rocking pin, and selectively operable release means co-operating with the latch means to release the pivoted actuator for rocking movement thereof about the pivot therefor to effect rocking of the rocking pin.

4. Long paper-feeding mechanism according to claim 3, wherein the latch means comprises a pivoted latch and a latch pin carried by the pivoted actuator for co-operation with the latch, and the release means comprises a release link connected to said latch and an electromagnet operable to effect lengthwise movement of the release link thereby to effect rocking of the latch to release the latch from the latch pin.

5. Long paper-feeding mechanism according to claim 4, including a spring co-operating with the pivoted actuator to effect rocking of the rocking pin on release of the actuator by said latch.

6. Long paper-feeding mechanism according to claim 5, including a cyclically operable restoring member operable to restore the pivoted actuator to the latched condition thereof.

7. Long paper-feeding mechanism for printing apparatus, comprising a paper-feeding shaft supported for rotation about the longitudinal axis thereof, paper-engaging elements rotatable with said shaft to effect linear movement of a paper web, a pinion rotatable with and relative to said shaft, a toothed paper-feeding sector meshing with said pinion and supported for rocking movement, a length-of-feed determining stop interposable into the path of said sector, a cam shaft supported for rotation, a selectively operable one-revolution clutch co-operating with said cam shaft to effect rotation thereof, a cam rotatable with the cam shaft, self-adjusting linkage connecting said cam with said sector to determine the extent of rocking movement of the sector, said linkage including a driving lever rockable about a pivot therefor by said cam, and driving links pivoted at one end to said sector and at the opposite end guided for movement lengthwise of an arcuate slot provided in the driving lever and having its centre of curvature co-incident with the pivot for the driving links when the sector and driving lever are in the positions thereof at which a long paper-feeding operation has been effected thereby, a rocking spindle, a rocking arm secured to the rocking spindle and pivotally connected to said driving links, a sector control spring co-operating with the rocking arm to urge the sector away from said stop during rotation of said shaft by driving means other than said sector, and restraining means co-operating with the rocking arm to constrain the arm against rocking movement thereof during operation of the driving lever to impart rotation to said shaft.

8. Long paper-feeding mechanism according to claim 7, wherein the restraining means comprises a toothed restraining sector rockable with said rocking spindle, a restraining pawl normally engaged with the restraining sector to prevent rocking thereof in one direction, a swinging arm freely mounted on the rocking spindle, a relief spring connected to said swinging arm and co-operating with said sector control spring to urge the swinging arm towards said restraining sector, and a sector-engaging abutment carried by the swinging arm and urged by the sector control spring into engagement with the restraining sector to effect rocking thereof to urge the paper-feeding sector away from said stop.

9. Long paper-feeding mechanism according to claim 8, including a paper-feeding sector restoring cam and a pawl-tripping cam rotatable with said cam shaft and adapted respectively by co-operation with the swinging arm to disengage the sector-engaging abutment from the restraining sector during a long paper-feeding operation of the paper-feeding sector and to release the restraining pawl from the restraining sector subsequent to a long paper-feeding operation of the paper-feeding sector thereby to permit rocking of the rocking spindle by the driving lever under control of a driving lever spring, the relief spring, and the paper-feeding sector restoring cam to restore the paper-feeding sector to the stop-engaging position thereof.

10. Long paper-feeding mechanism according to claim 9, including a plurality of length-of-feed determining stops separately interposable into the path of the paper-feeding sector, and selectively operable means co-operating with said stops to determine the order in which the stops are interposable into the path of the paper-feeding sector.

11. Long paper-feeding mechanism for printing apparatus, comprising a paper-feeding shaft supported for rotation about the longitudinal axis thereof, paper-engaging elements rotatable with said shaft to effect linear movement of a paper web, a ratchet wheel rotatable with said shaft, a pawl co-operable with said ratchet wheel to effect rotation thereof, a control lever connected to the pawl to effect operation thereof, a pivot arm movable relative to the control lever to determine the extent of the feeding stroke of the pawl and about which the control lever is pivoted, a continuously rotatable cam operable to effect rocking of the control lever about the pivot arm following each printing operation, a pinion rotatable with and relative to said shaft, a toothed paper-feeding sector meshing with said pinion and supported for rocking movement, a length-of-feed determining stop interposable into the path of said sector, a cam shaft supported for rotation, a selectively operable one-revolution clutch co-operating with said cam shaft to effect rotation thereof, a second cam rotatable with the cam shaft, self-adjusting linkage connecting said second cam with said sector to determine the extent of rocking movement of the sector, said linkage including a driving lever rockable about a pivot therefor by said second cam, and driving links pivoted at one end to said sector and at the opposite end guided for movement lengthwise of an arcuate slot provided in the driving lever and having its centre of curvature co-incident with the pivot for the driving links when the sector and driving lever are in the positions thereof at which a long paper-feeding operation has been effected thereby, a plurality of length-of-feed determining stops separately interposable into the path of the paper-feeding sector, selectively operable means co-operating with said stops to determine the order in which the stops are interposable into the path of the paper-feeding sector, a length-of-feed plate carried by said control lever, said plate being provided with a plurality of length-of-feed determining notches, a rocking pin with which the pivot arm is rockable to effect location of the pin in one or other of said notches, a setting arm rockable with said rocking pin, an abutment carried by the setting arm for movement therewith, a manually operable setting lever rockable about a pivot pin therefor and arranged for co-operation with said abutment, and a fixed setting plate co-operable with the setting lever to locate the setting lever in a predetermined position thereof thereby to determine with which of said notches the pivot arm is engaged.

12. Long paper-feeding mechanism according to claim 11, including a second setting lever manually rotatable about said pivot pin to co-operate with the setting plate and predetermine a second position of co-operation of the pivot arm with the length-of-feed determining plate, and selectively operable means to effect movement of the pivot arm from the position thereof as determined by said first-mentioned setting lever to that as determined by the second setting lever.

References Cited in the file of this patent

UNITED STATES PATENTS

| | | |
|---|---|---|
| 1,123,323 | Landsiedel | Jan. 5, 1915 |
| 2,059,215 | Dreher | Nov. 3, 1936 |
| 2,066,305 | Carroll et al. | Dec. 29, 1936 |
| 2,667,256 | Madsen | Jan. 26, 1954 |
| 2,806,692 | Stimson et al. | Sept. 17, 1957 |
| 2,873,116 | Lambert | Feb. 10, 1959 |